United States Patent
Moon

(10) Patent No.: US 7,564,010 B2
(45) Date of Patent: Jul. 21, 2009

(54) JAR TYPE CAULDRON

(76) Inventor: In Sool Moon, 915 Suneup2-Ri, Janghowon-Eup, Icheon-Shi, Gyeonggi-do (KR)

( * ) Notice: Subject to any disclaimer, the term of this patent is extended or adjusted under 35 U.S.C. 154(b) by 544 days.

(21) Appl. No.: 11/123,288

(22) Filed: May 6, 2005

(65) Prior Publication Data

US 2006/0249034 A1    Nov. 9, 2006

(51) Int. Cl.
*H05B 6/12* (2006.01)
*B29C 65/00* (2006.01)

(52) U.S. Cl. .............. 219/621; 156/87; 126/375.1; 99/275

(58) Field of Classification Search ........... 219/621, 219/730, 731; 156/87, 278, 89, 293, 89.11; 99/472, 279, 288, 295, 275; 228/164, 174; 220/421–422, 425, 574, 445–447, 592.16; 264/602, 250; 426/241, 568
See application file for complete search history.

(56) References Cited

U.S. PATENT DOCUMENTS

| | | | | | |
|---|---|---|---|---|---|
| 1,157,991 | A | * | 10/1915 | Linton | 126/390.1 |
| 3,985,990 | A | * | 10/1976 | Levinson | 219/729 |
| 4,595,437 | A | * | 6/1986 | Yamamoto | 156/87 |

* cited by examiner

*Primary Examiner*—Quang T Van
(74) *Attorney, Agent, or Firm*—Robert W. Becker & Assoc.; Robert W. Becker

(57) ABSTRACT

A jar type cauldron that includes a main body and a lid. The main body is made by shaping and then firing clay, and is constructed so that a bottom wall thereof is thicker than a sidewall thereof. An inner wall is provided in an upper portion of the main body to form a double-wall structure, thus narrowing a mouth provided on the top of the main body and defining a warming space. Further, a central insertion part is provided on the lower surface of the lid, and is inserted into the mouth provided on the top of the main body. A handle is provided in the center of the upper surface of the lid.

2 Claims, 3 Drawing Sheets

JAR TYPE CAULDRON

BACKGROUND OF THE INVENTION

1. Field of the Invention

The present invention relates generally to a rice cooker for cooking rice and, more particularly, to a jar type cauldron, which is constructed by shaping clay into a jar and firing the shaped clay to make a main body of the cauldron, and by providing an inner wall in an upper portion of the main body to form a double-wall structure, thus enhancing a warming effect and allowing rice to be well steamed, therefore allowing even unskilled persons to easily cook a large amount of rice well.

2. Description of the Related Art

Generally, a cooking utensil for cooking a large amount of rice is referred to as a cauldron, and the cauldron is made of iron. Since the cauldron is made of iron, the main body of the cauldron is rapidly heated when heat is applied to the bottom of the cauldron. Further, when the cooking process is completed and the heat is not applied, the main body of the cauldron is rapidly cooled.

Therefore, the conventional cauldron is problematic in that a user must not apply maximum heat, and the heat must be slowly reduced to allow rice to be steamed by its own heat, when the rice is almost completed. Thus, if the cook does not have a great deal of experience cooking rice, the rice may be underdone or overdone. Further, it is difficult to achieve a uniform taste.

SUMMARY OF THE INVENTION

Accordingly, the present invention has been made keeping in mind the above problems occurring in the prior art, and an object of the present invention is to provide a jar type cauldron, which allows even unskilled persons to easily cook a large amount of rice, in addition to allowing the entire cooked rice to have a uniform good taste.

In order to accomplish the above object, the present invention provides a jar type cauldron, including a main body made by shaping and then firing clay, and constructed so that a bottom wall thereof is thicker than a sidewall thereof, with an inner wall provided in an upper portion of the main body to form a double-wall structure, thus narrowing a mouth provided on a top of the main body and defining a warming space, and a lid to close the top of the main body, with a handle provided on an upper surface of the lid.

According to an aspect of the invention, a plurality of perforations is provided on a lower portion of the inner wall of the main body.

In another aspect of this embodiment, a central insertion part is provided on a lower surface of the lid, and is inserted into the mouth provided on the top of the main body.

In yet another aspect of this embodiment, a skirt is provided at a middle height on an outer surface of the main body, and the central insertion part of the lid has a rounded lower edge.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the present invention will be described in detail with reference to the accompanying drawings.

Figure 1:
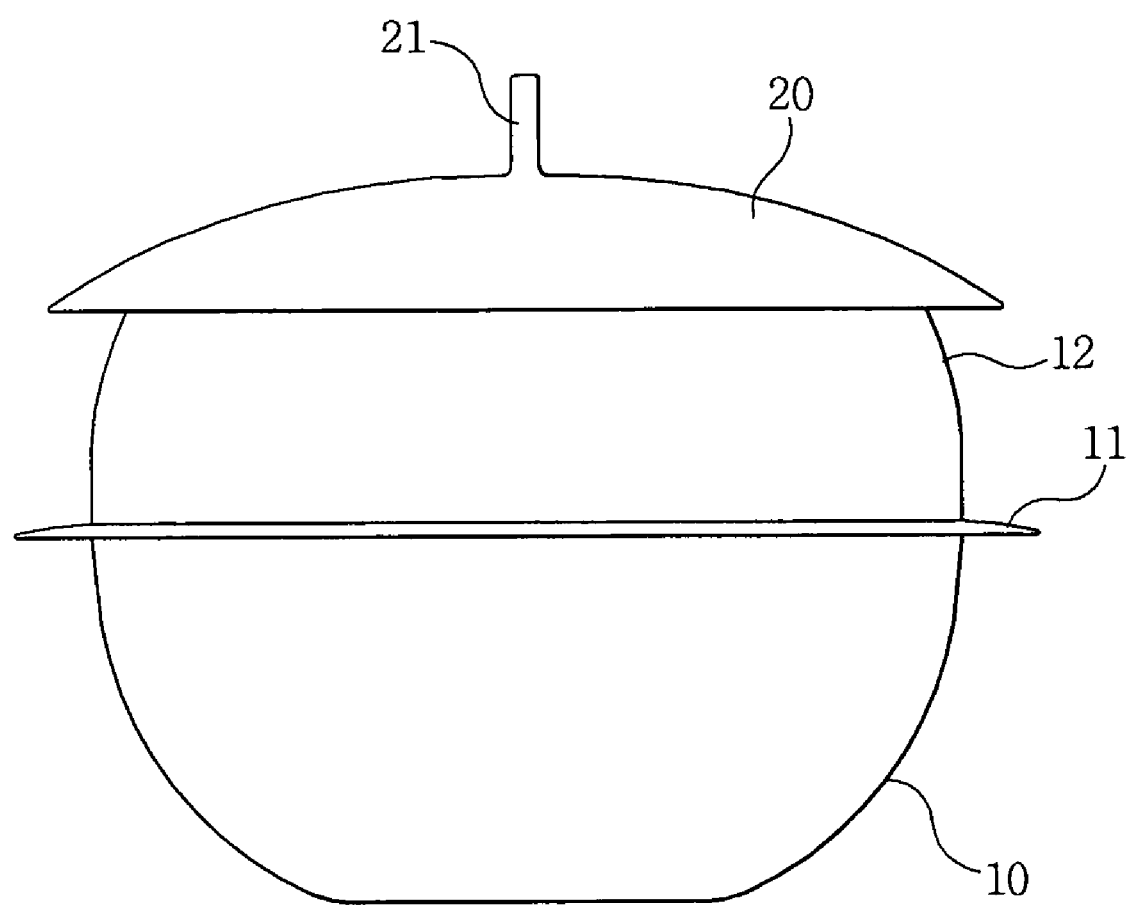
FIG. 1 is a side view of a jar type cauldron, according to the present invention.
Figure 2:
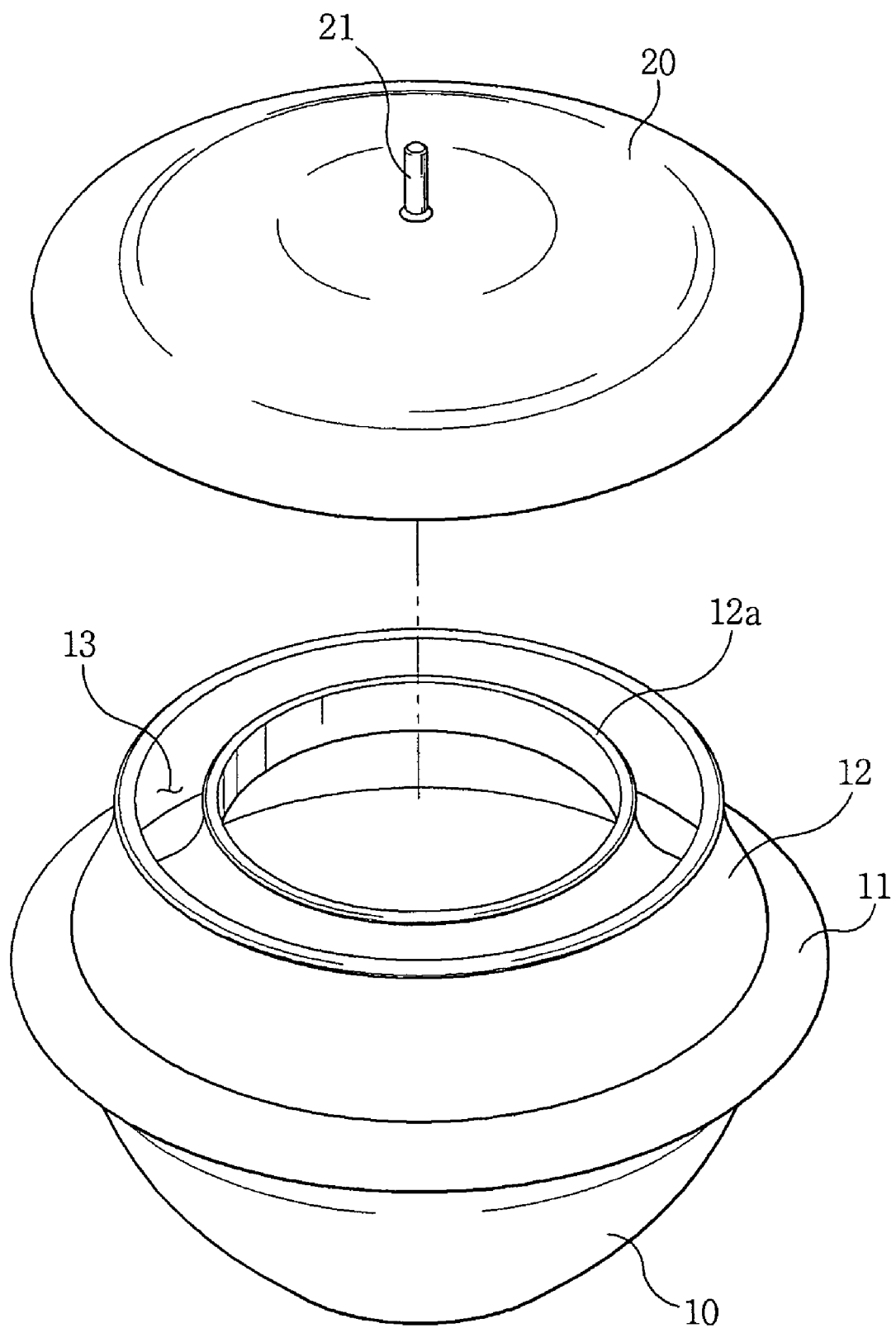
FIG. 2 is an exploded perspective view of the jar type cauldron of FIG. 1.
Figure 3:
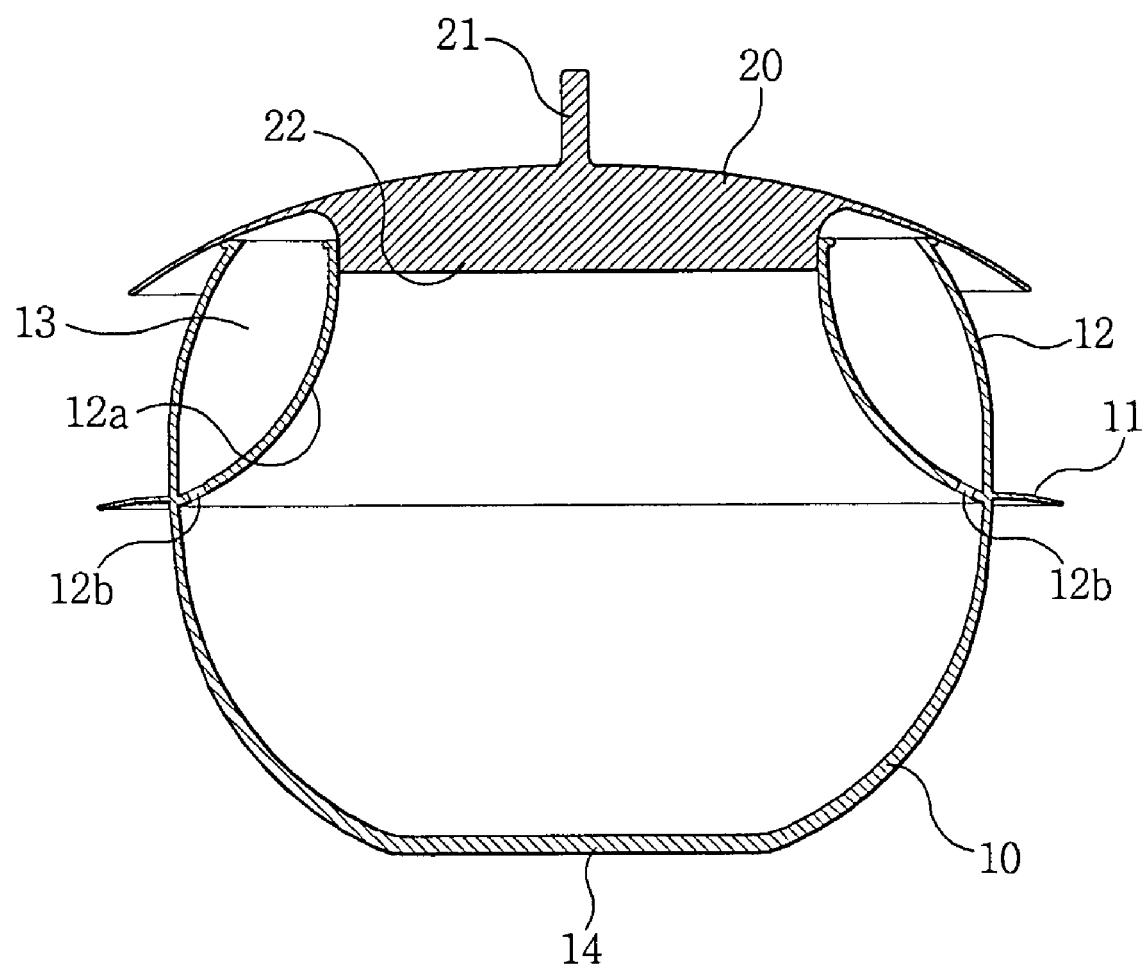
FIG. 3 is a sectional view of the jar type cauldron of FIG. 1.

FIG. 1 is a side view of a jar type cauldron, according to the present invention, FIG. 2 is an exploded perspective view of the jar type cauldron of FIG. 1, and FIG. 3 is a sectional view of the jar type cauldron of FIG. 1.

As shown in the drawings, the jar type cauldron includes a main body 10 shaped like a jar and a lid 20. The main body 10 is made by shaping and then firing clay. The bottom wall 14 of the main body 10 is thicker than the sidewall of the main body 10. The inner wall 12a is provided in the upper portion 12 of the main body 10 so that the upper portion 12 has a double-wall structure. The inner wall 12a reduces the area of the mouth, which is provided on the top of the main body 10, in addition to defining a warming space 13.

Further, a plurality of perforations 12b is provided on a lower portion of the inner wall 12a. The perforations 12b serve to allow overflowing water to flow back into the internal space of the main body 10, when water overflows over the top of the inner wall 12a during the cooking operation.

The main body 10 of the cauldron is manufactured using clay, in the same manner as a conventional large cauldron. But, the main body 10 may be made of a far infrared radiating material, such as quartz porphyry powder. Further, a skirt 11 is provided at a middle height on an outer circumferential surface of the main body 10, so that the cauldron may be supported over a flame by means of the skirt 11.

Since the bottom wall 14 of the main body 10 is thicker than other parts of the main body 10, the temperature of the heat is lowered to some extent, prior to being transmitted to the upper part of the main body 10. The thickness of the wall of the main body 10 decreases moving in a direction from the bottom to the top of the main body 10. Such a construction allows heat to be constantly transmitted to the internal space of the main body 10.

The inner wall 12a reduces the area of the mouth provided on the top of the main body 10, thus preventing heat from being undesirably dissipated to the exterior. Further, the inner wall 12a reflects the heat generated in the main body 10, and thereby transmits the heat to the top of rice. The warming space 13 is defined between the upper portion 12 of the main body 10 and the inner wall 12a, thus keeping the upper part of the internal space warm, therefore evenly heating the entire cauldron. Thereby, cooked rice has a good taste.

The lid 20 is made of clay, like the main body 10. However, the lid 20 may be made of materials other than clay. A handle 21 is provided at a central position on an upper surface of the lid 20, while a central insertion part 22 is provided in the center of a lower surface of the lid 20 to be inserted into the mouth provided on the top of the main body 10. Preferably, the central insertion part 22 is rounded at a lower edge thereof so that the central insertion part 22 may be smoothly inserted into the mouth of the main body 10, when a user places the lid 20 on the main body 10.

The jar type cauldron constructed as described above is operated as follows.

As in a typical rice cooking operation, the main body 10 is placed over a burner, and a proper amount of rice and a proper amount of water are put into the main body 10. Next, the lid 20 is closed and the burner is ignited. At this time, the fire comes into contact with the bottom wall 14 of the main body 10, thus heating the internal space of the main body 10. Since the bottom wall 14 is relatively thick, the temperature of the heat is lowered to some extent prior to being transmitted to the upper part of the cauldron. Such a construction prevents boiled rice from getting scorched and sticking to the bottom of the cauldron. Thus, the present invention allows the use of relatively high heat. Further, when water is heated and boiled, water bubbles overflow the inner wall 12a and enter the warming space 13. The overflowing water flows back into the internal space of the main body 10. That is, such a construction prevents boiling water from overflowing over the upper portion 12 of the main body 10.

Further, heat is transmitted through the wall of the main body 10 to the upper portion 12 of the main body 10. The main body 10 is constructed so that the thickness thereof decreases moving in a direction from the bottom to the top of the main body 10, so that the internal space of the cauldron is evenly heated. Particularly, the upper part of the main body 10 includes the inner wall 12a and the warming space 13, and hot air rising in the internal space is reflected by the inner wall 12a and the central insertion part 22 of the lid 20, so that the top of rice is evenly heated. Therefore, all of the rice is evenly boiled.

After a predetermined period, the fire is put out so as to steam the boiled rice by its own heat. In this case, although the fire is abruptly extinguished, the main body 10 is made of clay and the bottom wall 14 is thick, thus keeping the internal space of the main body 10 warm for a lengthy period of time. Further, the upper part of the internal space remains warm due to the inner wall 12a and the warming space 13, so that the boiled rice is evenly steamed.

Therefore, when rice is cooked using the cauldron of this invention, all of the boiled rice has a uniformly good taste. Further, the entire cauldron is evenly heated and warmed, so that even unskilled persons can easily cook rice, as long as the amount of water is appropriately regulated.

When the main body 10 of this invention is manufactured using a far infrared radiating material, far infrared rays irradiate the rice, thus allowing the cooked rice to have a better taste.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

As described above, the present invention provides a jar type cauldron, which allows even unskilled persons to easily cook a large amount of rice, in addition to allowing all of the cooked rice to have a uniformly good taste.

The present invention is, of course, in no way restricted to the specific disclosure of the specification and drawings, but also encompasses any modifications within the scope of the appended claims.

What is claimed is:

1. A steam-cooking cauldron for cooking food, comprising:
   a main body comprised of shaped and fired clay, wherein a bottom wall of said main body is thicker than a sidewall of said main body, such that a thickness of the sidewall decreases moving in a direction from the bottom to the top of the main body, thereby allowing heat to be constantly transmitted to an internal space of the main body;
   an inner wall provided in an upper portion of the main body to form a double-wall structure in said upper portion;
   a mouth provided on a top of the main body, wherein the inner wall reduces a total area of said mouth, thereby preventing heat from being dissipated to an exterior of said cauldron, wherein a plurality of perforations is provided on a lower portion of the inner wall of the main body, wherein said perforations are positioned and configured to allow overflowing water to flow back into the internal space of the main body when water overflows over a top of the inner wall during a cooking operation;
   a lid to close the top of the main body, with a handle provided on an upper surface of the lid;
   a warming space defined by the inner wall and margin of the lid at an upper and margin portion of the main body, wherein said warming space is configured to enhance a warming effect of an upper portion of food to be cooked in said cauldron and uniform cooking of food in the upper and lower portions of said main body.

2. The jar type cauldron as set forth in claim 1, wherein a central insertion part is provided on a lower surface of the lid for insertion into the mouth provided on the top of the main body.

* * * * *